G. HAMMER.
TWINE TENSION FOR BINDERS.
APPLICATION FILED JULY 6, 1915.

1,290,984.

Patented Jan. 14, 1919.

Inventor.
Gustaf Hammer,
By Chas. E. Lord
Atty.

UNITED STATES PATENT OFFICE.

GUSTAF HAMMER, OF CHICAGO, ILLINOIS, ASSIGNOR, BY MESNE ASSIGNMENTS, TO INTERNATIONAL HARVESTER COMPANY, A CORPORATION OF NEW JERSEY.

TWINE-TENSION FOR BINDERS.

1,290,984.           Specification of Letters Patent.      Patented Jan. 14, 1919.

Application filed July 6, 1915. Serial No. 38,282.

*To all whom it may concern:*

Be it known that I, GUSTAF HAMMER, a citizen of the United States, residing at Chicago, in the county of Cook and State of Illinois, have invented certain new and useful Improvements in Twine Tensions for Binders, of which the following is a full, clear, and exact specification.

My invention relates to twine tensions for binders.

It has for its object to maintain under tension in an improved manner the twine supplied from the twine can of a harvester or the like to the binding needle thereof so that all undue strains or deleterious slack in the twine are effectually removed and irregularities in quality of the twine fed, arising, for instance, from knots or the like, are prevented from producing such strains or interrupting the maintenance of the even tension desired. I attain these objects by an improved construction of twine tension comprising coöperating stationary and movable twine engaging members, preferably in the form of collars, which operate in an improved manner whereby the increased tension on the twine causes the movable twine engaging member to move away from the stationary member in the direction of the source of tension.

In the accompanying drawings I have, for purposes of illustration, shown one embodiment which my invention may assume in practice.

Figure 1:
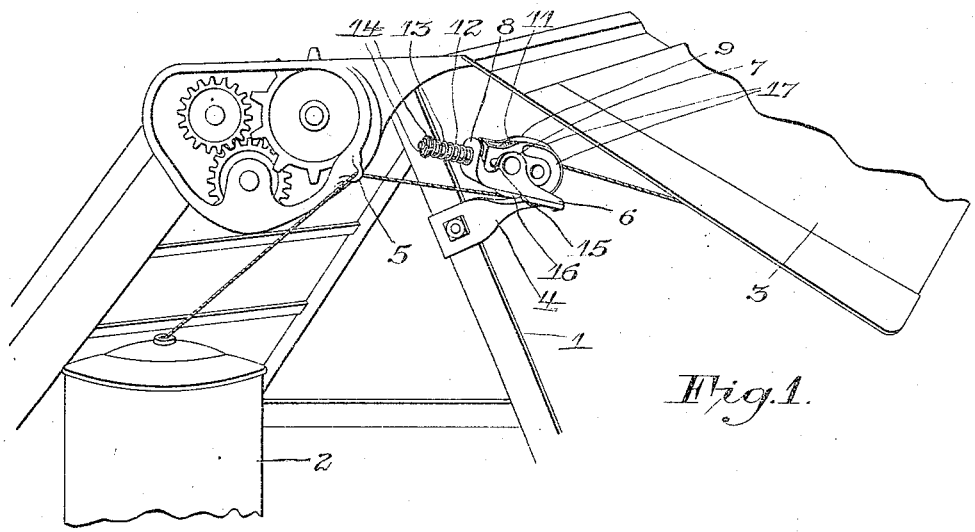
Figure 1 is a side elevation of a grain binder equipped with my improvement.
Figure 2:
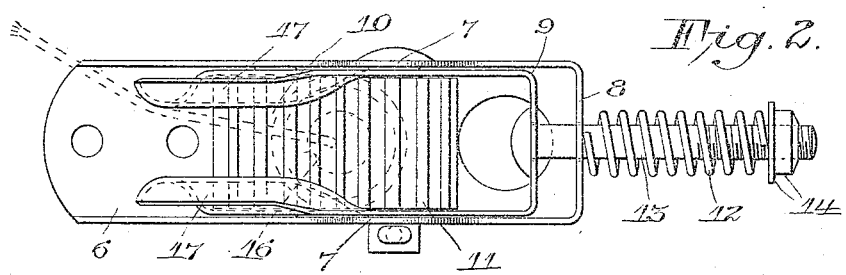
Fig. 2 is a top plan view of the twine tension.
Figure 3:
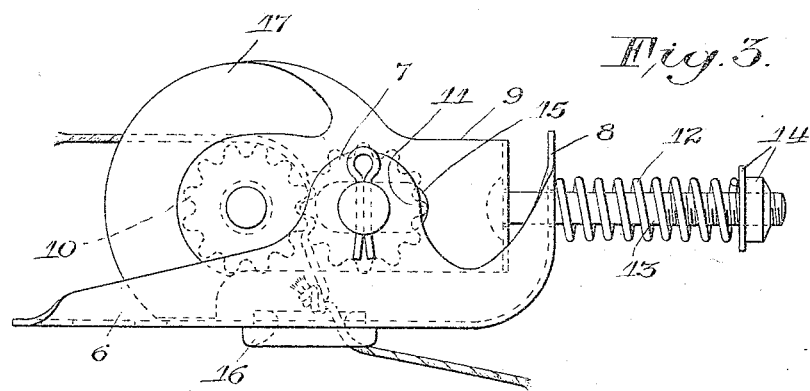

Fig. 3 is a side elevation of the twine tension.

In these drawings I have shown a binder 1 of standard construction having a twine can 2, the usual needle and binding mechanism being omitted as unnecessary, as it is well understood that when the device is used in connection with a binder, a binding needle moves upward through the deck 3. Upon this binder the twine tension is mounted upon a bracket 4 at a point adjacent the rear end of the deck 3 and above the twine can 2, the twine passing diagonally upward and forward, preferably, though not necessarily, through a guide 5, to reach the tension, moving upward through it, and thereafter again extending diagonally downward and forward to the binding needle in a path substantially parallel to its path through the guide 5 and the tension.

In my improved construction the tension comprises a stationary section and a reciprocable section, each carrying a twine engaging or tension member. The stationary section 6 is fixed to the bracket 4 and has upstanding ears 7 on its opposite side and an upstanding lip 8 on its end adjacent the twine can. Movable between the ears 7 in a path to and from the lip 8 is the reciprocable section 9, which preferably assumes the form of a reclining U-shaped member slidable on its side. The twine engaging or tension member on this section 9 is shown in the form of a pinion 10 which normally engages with its coöperating tension member, preferably also in the form of a pinion 11 journaled on the ears 7 of the stationary section, the engaging or meshing action of these parts being due to a spring 12. As shown, this spring is coiled about the free end of a member or bolt 13 which is seated in the bowed end of the member 9 and extends longitudinally through an opening in the lip 8, the spring 12 normally tending to assume its expanded position on the member 13 and acting between the outer surfaces of the lip 8 and an adjustable washer nut connection 14 carried on the free end of the member 13 in such a manner as to hold the pinions in mesh. The pinion 10 is, however, movable out of mesh with the pinion 11 whenever increased tension is applied to the twine, slots 15 being provided in the sides of the movable section 9 to permit such a movement and the twine being so passed through the tension as to bring about this movement when increased tension is applied to it, the twine entering the tension through a nonfraying eyelet 16 in the bottom of the member 6, and extending upward between the pinions 10 and 11 and outward over the movable pinion 10 between arcuate, inwardly extending, non-fraying twine guiding cheeks 17 on the member 9 in a path substantially parallel to that by which it entered the tension.

In the operation of this device, as the twine is drawn from the receptacle 2 by the successive actions of the needle and binding mechanism, it is to be noted that, due to the fact that the twine passes upward between the pinions 10 and 11 and outward over the movable pinion 10, a very even tension is maintained upon the twine, previous difficulties, such as wide variations in twine tension and twine breakages heretofore encountered where the twine passes over a stationary element, being effectually overcome. In my improved construction neither a hard pull, such as that caused by hard balling or twisted twine, nor knots, such as those caused by ravelings or the intentional knotting following the connection of a new ball, can interfere with the efficient operation of the device or cause breakage of the twine, the pull on the twine from the needle instead acting directly upon the movable pinion and against the spring 12 in such a manner that the pinion is readily moved in the direction of the source of tension and separated from the stantionary pinion to let the twine pass freely through the tension.

By the use of my improved construction, the necessity for frequent stopping of the machine to straighten out the twine or rethreading the needle has been removed. It has further been found that, due to the provision of my improved tension, it is unnecessary to use binder twine of such an expensive character as has heretofore been considered necessary, the usual difficulties attendant upon the use of a cheaper twine being overcome by my improved tension device. It should here also be noted that the construction shown is of an exceptionally sturdy character and that it may be very readily and cheaply manufactured, the stationary and movable sections being, if desired, stamped from sheet metal.

While I have in this application specifically described one embodiment which my invention may assume in practice, it is, of course, to be understood that the form shown is used for purposes of illustration and that the invention may be modified without departing from its spirit.

What I claim as new is:

1. In a twine tension, a stationary member U-shaped in longitudinal section, a roller journaled on said stationary member at one side of the end wall thereof, a movable member reciprocable upon said stationary member transversely with respect to the axis of said roller and between the side walls thereof, a second roller journaled on said reciprocable member on the opposite side of said first mentioned roller from the end wall thereof, means operatively connected between said reciprocable member and the end wall of said stationary member normally retaining said rollers in twine engaging position, and means carried by said reciprocable member for guiding the twine as it leaves the reciprocable section.

2. In a twine tension, a stationary section, a rotatable twine engaging member journaled thereon, a movable section reciprocable with respect to said twine engaging member and having inwardly curved twine guiding cheeks on its opposite sides, a twine engaging member journaled on said movable section between said cheeks and the twine engaging member on said stationary section, resilient means normally holding said twine engaging members in twine engaging position, and means on said stationary member located substantially beneath the coöperating surfaces of said twine engaging members for deflecting the twine upward between the same.

3. In a twine tension, a stationary section having an upstanding member thereon, a roller journaled on said stationary section at one side of said upstanding member, a movable section having openings in its sides and reciprocable transversely relative to the axis of said roller, a roller journaled in said movable section on the opposite side of said first mentioned roller from said upstanding member, a longitudinally disposed member carried by said movable section at a point between said first mentioned roller and upstanding member and protruding through said upstanding member, and a coiled spring carried on the protruding end of said longitudinally disposed member normally maintaining said rollers in twine engaging position.

4. In a twine tension, a stationary section having upstanding sides and an upstanding lip at one end of the same, a pinion journaled in said upstanding sides, a substantially U-shaped member seated between said sides having its bowed portion disposed adjacent said lip and slots in its sides whereby it may move longitudinally of said stationary section, a pinion journaled in said U-shaped member on the opposite side of said first mentioned pinion from said lip, a longitudinally disposed member carried by the bowed portion of said U-shaped member and protruding through said lip, and a coiled spring carried on the protruding end of said longitudinally disposed member operative between the free end of said member and the outer surface of said lip.

5. In a twine tension, a stationary section, a twine engaging member journaled thereon, and a movable section reciprocable with respect to said twine engaging member and having inwardly curved twine engaging cheeks on its opposite sides.

In testimony whereof I affix my signature.

GUSTAF HAMMER.